United States Patent [19]

Caron

[11] Patent Number: 5,156,248
[45] Date of Patent: Oct. 20, 1992

[54] CLUTCH THRUST BEARING

[75] Inventor: Fabrice Caron, Montigny-le-Bretonneux, France

[73] Assignee: SKF France, Clamart Cedex, France

[21] Appl. No.: 746,717

[22] Filed: Aug. 19, 1991

[30] Foreign Application Priority Data

Sep. 7, 1990 [FR] France .................. 90 11137

[51] Int. Cl.⁵ .............................. F16D 23/14
[52] U.S. Cl. .................... 192/98; 192/99 S; 192/110 B; 384/612
[58] Field of Search ............ 192/98, 99 R, 99 A, 192/99 S, 110 B, 30 V; 384/495, 536, 612

[56] References Cited

U.S. PATENT DOCUMENTS

| | | | |
|---|---|---|---|
| 1,626,427 | 4/1927 | Reed | 192/98 X |
| 2,840,208 | 6/1958 | Zeidler et al. | 192/99 R |
| 3,250,356 | 5/1966 | Zeidler | 192/99 S X |
| 4,117,916 | 10/1978 | Baker | 192/98 |
| 4,576,268 | 3/1986 | Brandenstein et al. | 192/98 |
| 4,997,075 | 3/1991 | Nakamura et al. | 192/98 |

FOREIGN PATENT DOCUMENTS

| | | | |
|---|---|---|---|
| 111204 | 6/1984 | European Pat. Off. | 192/98 |
| 1425361 | 2/1969 | Fed. Rep. of Germany . | |
| 3240076 | 5/1984 | Fed. Rep. of Germany . | |
| 2381939 | 9/1978 | France . | |
| 2072789 | 10/1981 | United Kingdom | 192/98 |

Primary Examiner—Richard Lorence
Attorney, Agent, or Firm—Beveridge, DeGrandi & Weilacher

[57] ABSTRACT

A clutch thrust bearing includes a rolling bearing (1) equipped with an inner and an outer ring, one of the rings (6) being in permanent contact with a clutch member; and a guide sleeve (12) with a radial flange (13) relative to which the rolling bearing (1) can be displaced radially. The guide sleeve is axially slidable with respect to a guide tube under the action of a control member (17) having end fingers (18) for moving a metal support plate (15) integral with the radial flange (13) of the guide sleeve. The improvement includes contact shoes (19) which receive the end fingers (18) of the control member and are located between the fingers and the metal support plate of the radial flange.

16 Claims, 2 Drawing Sheets

CLUTCH THRUST BEARING

The present invention relates to a clutch thrust bearing of the type comprising a rolling bearing in which one of the rings comes into permanent contact with a clutch member, and in particular with the diaphragm of the clutch. The clutch thrust being also comprises a guide sleeve equipped with a radial flange relative to which the rolling bearing can be displaced radially in order to ensure the self-alignment of the clutch thrust bearing during the clutch-release operations. The guide sleeve can slide axially with respect to a guide tube under the action of a control member, also termed a clutch-release fork, having end fingers capable of coming into contact with one surface of a metal support plate integral with the radial flange of the guide sleeve.

During the operation of this type of clutch thrust bearing, termed a constant-contact clutch thrust bearing, in other words in which the rotating ring is in permanent contact with the diaphragm of the clutch, the contact is made with a slight preloading in the clutch-engaged state, and with a greater clutch-release load during the clutch-release operation.

A certain number of difficulties are encountered in these clutch thrust bearings at the location of the contact between the end fingers of the control member and the guide sleeve of the thrust bearing.

Firstly, the phenomena of wear occur at the location of this contact by virtue of the kinematics of the relative movement between the control member and the clutch thrust being. Indeed, the thrust being slides axially on the guide tube, whilst the control member pivots relative to a fixed point or axis which is situated at a certain distance from the axis of sliding of the thrust bearing. There results a relative slipping between the respective contact surfaces of the control member and of the clutch thrust bearing. The end fingers of the control member are usually made from steel and terminate in a rounded convex shape. They bear by way of this convex end on a bearing surface of the thrust bearing, consisting of or reinforced by a metal support plate usually made from steel which has been treated in order to have a high hardness.

The relative slipping of the contact surfaces between the control member and this metal support plate therefore take place in poor conditions, in other words steel against steel and with a high stress concentration at the contact point. There results a relatively rapid wear of the end fingers of the control member and of the metal support plate.

Independently of these problems of wear, the appearance and the transmission of vibrations and noises has been noted, which are promoted by the steel/steel contact between the control member and the thrust bearing. These vibrations are then transmitted from the assembly of the engine unit comprising the gear box and its clutch thrust bearing to the passenger compartment of the vehicle.

Moreover, a certain play frequently exists between the lateral guide surfaces of the thrust bearing and the end fingers of the control member. This play also promotes the appearance of vibrations generating noises which originate in the vicinity of the control member, in particular when the thrust bearing is only slightly loaded.

French Patent No. 2,536,482 (SKF) describes a clutch thrust being having means capable of filtering or absorbing the noises and the vibrations. These means consist of four rubber or elastomeric blocks which are over-moulded or glued onto the metal support plate of the clutch thrust bearing and are interposed between the metal support plate and the radial flange of the guide sleeve. During the clutch-engaging operation, the rubber blocks are crushed, the metal support plate then coming into direct contact with the radial flange of the guide sleeve. These means are relatively complex, and hence expensive to produce. Furthermore, they do nothing to resolve the problems of wear between the end fingers of the control member and the metal support plate of the thrust bearing.

The subject of the present invention is a clutch thrust bearing of the above mentioned type, making it possible to limit to the maximum the wear of the surfaces of the metal support plate and of the end fingers of the control member, whilst at the same time eliminating the transmission of the vibrations, and to achieve this in an extremely simple and economical manner.

The clutch thrust being according to the invention comprises a rolling bearing equipped with an inner and an outer ring, one of the said rings being adapted in order to come into permanent contact with a clutch member. A guide sleeve comprises a radial flange relative to which the rolling being can be displaced radially, it being possible for the guide sleeve to slide axially with respect to a guide tube under the action of a control member having end fingers for moving a metal plate integral with the radial flange of the guide sleeve. According to the invention, the clutch thrust being furthermore comprises contact shoes capable of receiving the end fingers of the control member and placed in between the said fingers and the contact surface of the radial flange.

The contact shoes are preferably made from a material having a low coefficient of friction.

The end fingers of the control member are preferably convex, the shoes then having a corresponding concave receiving surface, opposite a plane surface which interacts with the likewise plane contact surface of the radial flange of the guide sleeve of the metal support plate.

The shoes can advantageously have an axial rim for the guidance of the end fingers of the control member.

In a preferred; embodiment of the invention, the guide sleeve is made from a moulded synthetic material and the shoes are integrally moulded with the sleeve. When removed from the mould, the contact shoes are joined to the sleeve by linking webs having a reduced cross-section so as to break under the action of the force exerted by the control member on the contact shoes, when the clutch thrust bearing is operated for the first time.

The contact shoes are advantageously integral with an annular collar which is likewise integrally moulded with the guide sleeve and joined to the latter by linking webs.

The assembly consisting of the contact shoes, and possibly the annular collar, is, when removed from the mould, simply in contact with the metal support plate of the clutch thrust bearing, the plane and smooth surface of the support plate offering no adhesion and no attachment to the moulded synthetic material.

When the clutch thrust bearing is operated for the first time, when mounted on the vehicle, t he end fingers of the control member engage in the concave receiving surfaces of the shoes. The kinematics of the end fingers and of the clutch thrust being five rise to transverse forces which cause the shearing of the zones of weakened cross-section of the linking webs originally joining the contact shoes to the guide sleeve, possibly via the annular collar. The assembly consisting of the contact shoes, and possibly the annular collar, remains in contact with the support plate of the thrust being but can henceforth be displaced, plate surface on plane surface, against the support plate. The contact shoes guided by the end fingers of the control member can execute, relative to the support plate of the clutch thrust bearing, the natural relative slipping movements which the end fingers of the control members impart to them during the operation of the clutch thrust bearing.

With the clutch thrust being of the invention functioning in constant contact with the diaphragm of the clutch, the assembly consisting of the contact shoes, and possibly the annular collar, cannot escape and is held constantly applied against the support plate by the end fingers of the control member. The contact pressures between the end fingers and the contact shoes, and between the contact shoes and the support plate, are reduced given the relatively considerable dimensions of the contact surfaces.

A mouldable material having a low coefficient of friction and good mechanical properties is preferably chosen for the manufacture of the guide sleeve and of the contact shoes, for example a plastic reinforced with glass fibres and molybdenum bisulphide.

In an advantageous embodiment of the invention, the guide sleeve has guide lugs for the control member, equipped with resilient tabs coming into contact with the end fingers and exerting a lateral prestress thereon. The oscillations caused by the play existing between the control member and the lugs of the guide sleeve are thus eliminated or appreciably reduced.

The invention will be better understood upon studying an embodiment described with no limitation being implied and illustrated by the attached drawings, in which.

Figure 3:
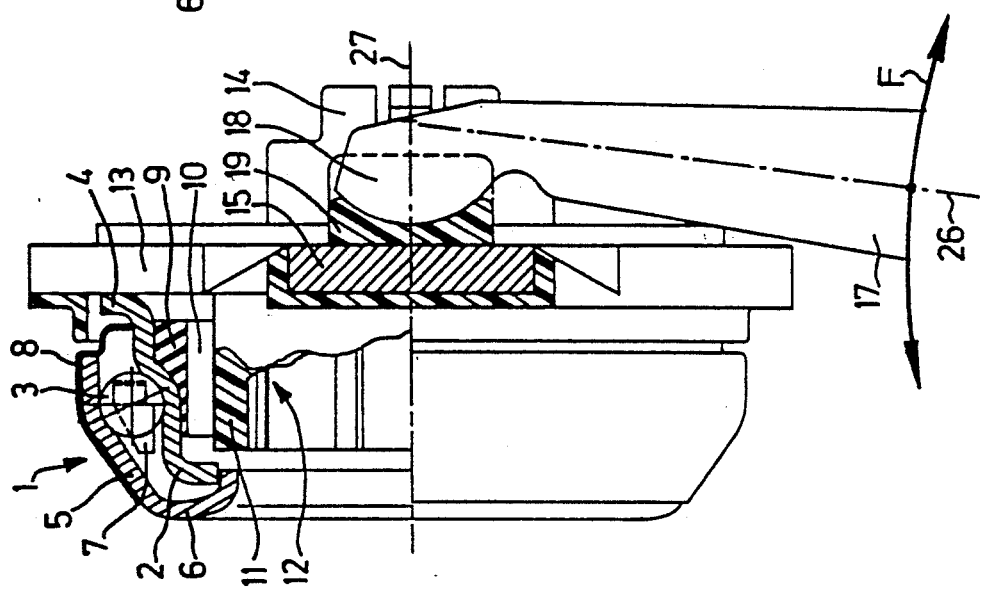
FIG. 3 is a partial view in cross-section along III—III in FIG. 1, a cutaway being shown in cross-section in order to illustrate; the contact between the contact shoes and the support plate, the assembly being shown before mounting on the vehicle and also illustration the position of the various elements in the clutch-engaged position.

As shown in the figures, and in particular in FIG. 3, the clutch thrust being according to the invention comprises a rolling bearing, referenced as a whole by 1, equipped with an inner thin-wall rolling-contact ring 2 produced by deep drawing of a tube or a piece of sheet metal having a raceway for a row of balls 3. The inner ring 2 has a radial flange 4 pointing outwards. The rolling bearing 1 is completed by an outer ring 5, likewise with a thin wall, produced by deep drawing of a piece of sheet metal or a tube, and which comprises a toroidal portion 6 which is held in constant contact with the surface of the diaphragm of a clutch, not shown in the figures. The balls 3 are retained by a cage 7, the rolling bearing 1 being protected by a cover plate 8.

A sleeve made from flexible resilient material 9, for example from an elastomer or natural rubber, is arranged inside the inner ring 2 and comprises a plurality of ribs 10 parallel to the axis of the thrust bearing and pointing inwards. The free edge of the ribs 10 comes into contact with a cylindrical portion 11 of a rigid guide sleeve referenced as a whole by 12 and made from a rigid moulded synthetic material. The bore of the cylindrical portion 11 is in slipping contact with the outer surface of a guide tube, not shown in FIG. 3, ensuring the guidance of the longitudinal displacement of the thrust being during each clutch-release operation. The guide sleeve 12 comprises a radial flange 13. The radial flange 13 comprises two diametrically opposite radial extensions 14, also visible in FIG. 1.

The radial arm 4 in the form of an annular flange of the inner ring 2 is in friction contact with the radial flange 13 of the guide sleeve 12. In this way, during a clutch-release operation, the rolling being 1 can be displaced relative to the guide sleeve 12 by virtue of the deformation of the ribs 10 of the resilient sleeve 9. This displacement takes place in a radial plane by virtue of the friction contact between the radial arm 4 and the corresponding plane face of the radial flange 13.

Figure 1:
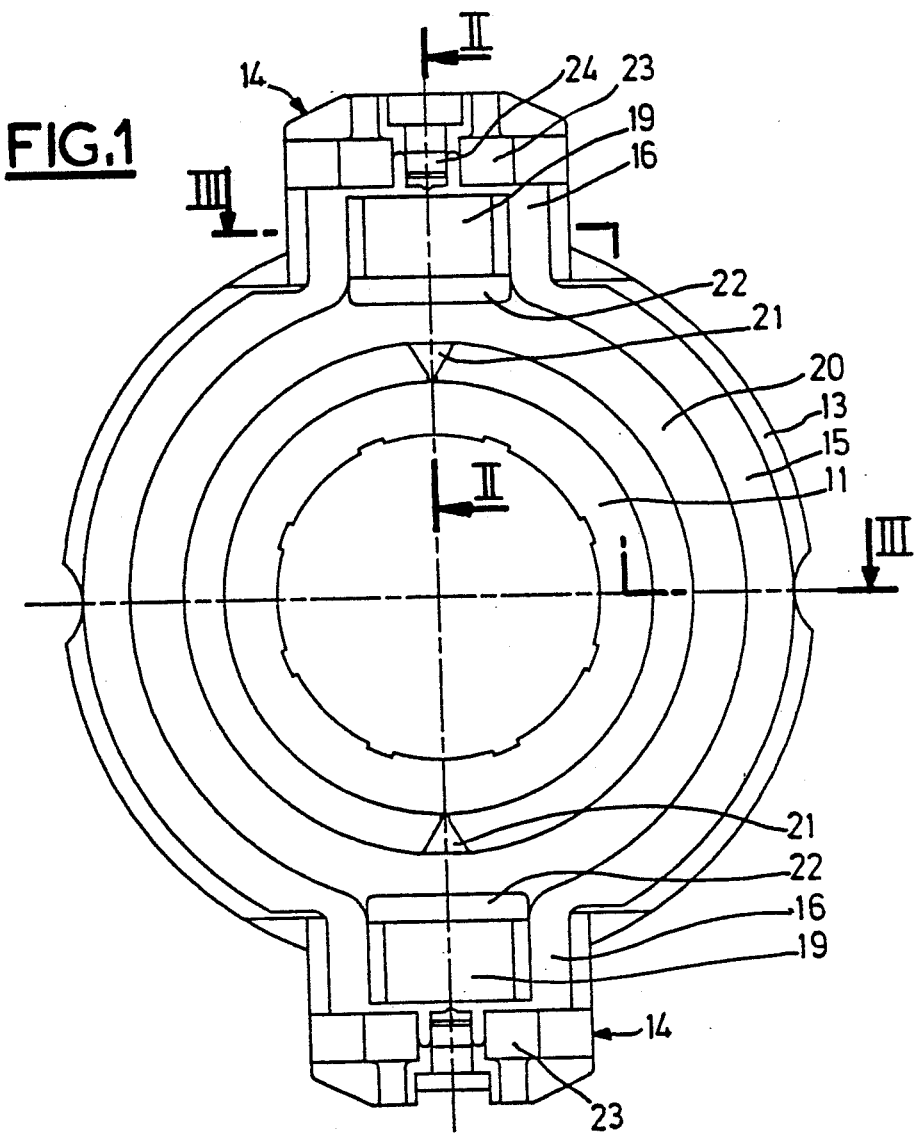
FIG. 1 is an external side view of a clutch thrust being according to the invention before its mounting on a vehicle, when the contact shoes are still joined to the guide sleeve.

A metal support plate 15 covers the radial flange 13 opposite the rolling bearing 1, and has an outer contour substantially matching the shape of the radial flange 13. In particular, the support plate 15 also comprises, as can be seen in FIG. 1, two radial extensions 16 which are placed opposite the radial extensions 14 of the flange 13. The guide sleeve 12 is produced by over-moulding synthetic material around the metal support plate 15. The material used for the guide sleeve 12 preferably has a low coefficient of friction and good mechanical properties. It will be possible, for example, to use a plastic reinforced with glass fibres and molybdenum bisulphide.

Figure 5:
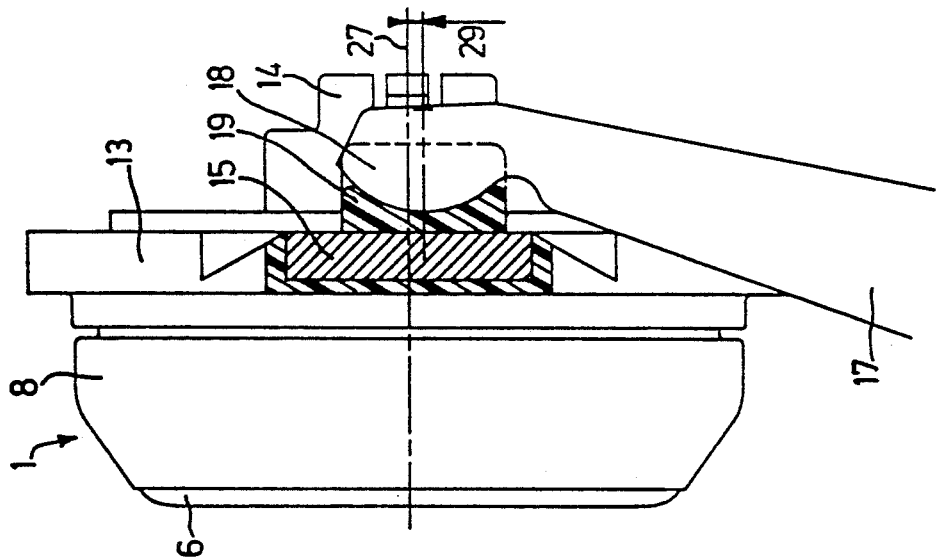
FIG. 5 is a view similar to that in FIG. 4 showing the position of the various elements in the clutch-engaged position after a certain wear of the clutch.
Figure 4:
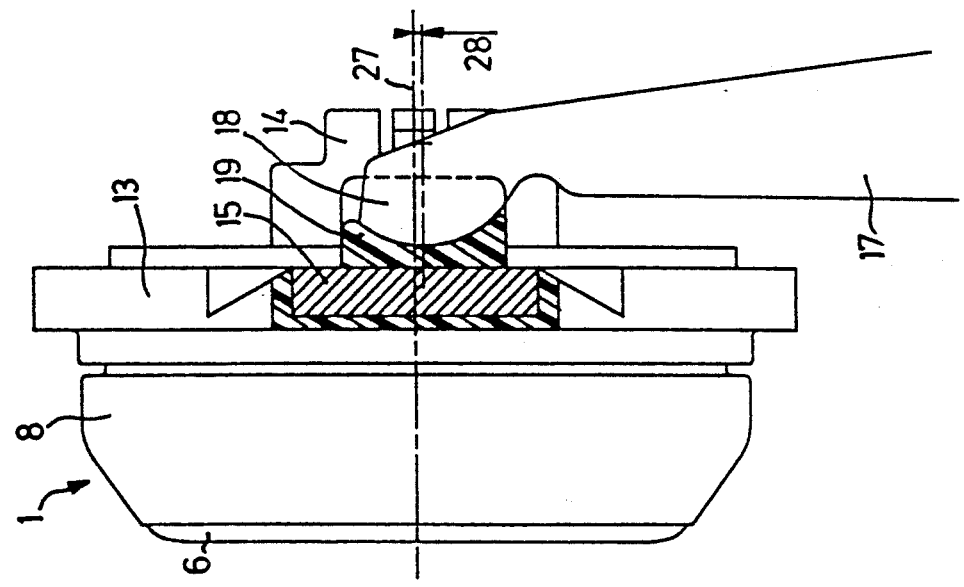
FIG. 4 is a view similar to FIG. 3 showing the position of the various elements during a clutch-release operation.

The control member of the clutch thrust bearing has the general shape of a fork with two arms, one of which can be seen in FIGS. 3 to 5 and is referenced by 17. At the end of each of the arms 17 there is an end finger 18 having a convex surface. Two diametrically opposed contact shoes 19, which can be seen in FIG. 1, are placed in between the end fingers 18 and the radial extensions 16 of the support plate 15. The surface of the contact shoes 19 situated opposite the end fingers 18 has a concave receiving shape corresponding to the convex profile of the end fingers 18, as can be seen in FIGS. 3 to 5. In contrast, the surface of the contact shoes 19 is plane so as to be able to slip on the plane surface of the metal support plate 15.

The two shoes 19 are integral with an annular collar 20 (FIG. 1) which is joined to the guide sleeve 11 by two linking webs 21 having a weakened cross-section.

Figure 2:
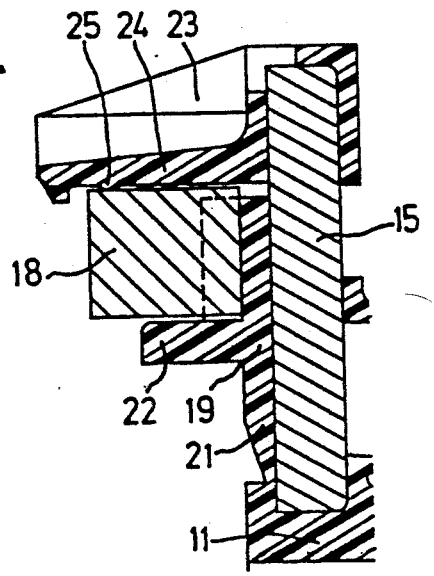
FIG. 2 is a partial view in cross-section along II—II in FIG. 1, on which an end finger of the control member has also been shown in cross-section.

Under these conditions, the contact shoes 19 and the annular collar 20 are integrally moulded with the guide sleeve 12 equipped with its cylindrical portion 11, and are thus constituted, like the latter, from a synthetic material with a low coefficient of friction. The weakened cross-sections of the linking webs 21 permit, as will be seen below, the disconnection of the assembly formed by the contact shoes 19 and the collar 20 with respect to the guide sleeve 12 when the thrust bearing is operated for the first time after having been mounted on the vehicle. In FIGS. 1 and 2, the clutch thrust bearing is shown before being mounted on the vehicle, the linking webs 21 not yet having been broken. It will be understood that, in another embodiment, the collar 20 could be dispensed with, the contact shoes 19 then being joined directly to the guide sleeve 12 by linking webs of weakened cross-section.

Each contact shoe 19 further more has, in the example illustrated, a guide rim 22 (FIGS. 1 and 2) directed axially with a respect to the axis of the clutch thrust bearing and intended to interact with the corresponding end finger 18 in order to guide the latter during the movements of the control member 17.

Furthermore, in the example illustrated, the two radial extensions 14 of the flange 13 of the guide sleeve 12 have guide lugs 23 which also extend axially in the same direction as the guide rims 22 and having a resilient tab 24 provided with a contact boss 25 which can come into contact wit the end finger 18, as can be seen in FIG. 2, in order to exert on the latter a lateral prestress intended to eliminate or reduce the lateral oscillations of the control member 17 by eliminating the play which usually exists between the end finger 18 of the control member, and the lugs 23 of the guide sleeve.

The clutch thrust bearing of the invention functions as follow, with reference to FIGS. 3 to 5.

Before mounting on the vehicle, the clutch thrust bearing has the structure illustrated in FIGS. 1 and 2, the assembly formed by the contact shoes 19 and the annular collar 20 being integral, by way of the linking webs 21, with the cylindrical part 11 of the guide sleeve 12. FIG. 3 illustrates the clutch thrust bearing after it has been mounted on the vehicle, the end fingers 18 of the arms 17 of the control member having become lodged in the concave receiving surfaces of the contact shoes 19. As can be seen in FIG. 3, the arms 17 of the control member can pivot in the direction of the arrow F about a pivoting point placed at the end of the axis 26 and at a certain distance form the axis 27 relative to which the clutch thrust bearing as a whole can be displaced longitudinally and about which rotates the outer ring 6 of the rolling bearing 1. It will be understood that, because of these combined movements, the contact shoes must be able to slip on the surface of the support plate 15.

During the first clutch-release operation illustrated in FIG. 4, the arms 17 of the operating member pivot, displacing the clutch thrust bearing towards the left in the figure with respect to the position illustrated n FIG. 3. Transverse forces result which cause the shearing of the zones of weakened cross-section of the linking webs 21, the contact shoes 19 slipping on the support plate 15 with a downwards displacement referenced 28.

During these movements, the two ends 18 are appropriately guided and centred laterally by the guide rims 22 and are retained by the resilient tabs 24 (FIG. 2). In the clutch-engaged position, the various elements resume their initial position, illustrated in FIG. 3, the outer rotating ring 6 at all times remaining in contact with the diaphragm (not illustrated in the figures) by virtue of the pre-load exerted via the operating member.

The position of the various elements in the clutch-engaged state varies over time with the wear of the discs and the lining of the clutch, the changes with a position such as that illustrated in FIG. 5, the arms 17 of the operating member pivoting gradually backwards ((to the right in the figure) and the contact shoes 19 gradually shifting by a distance 29 relative to the axis 27.

By virtue of the structure of the clutch thrust bearing of the present invention, it is possible to limit considerably the wear of the contact pieces whilst at the same time reducing the operating forces by virtue of the fact that the contact pressures are reduced by the interposition of the contact shoes 19. Furthermore, the vibrations are absorbed, the noises thus being filtered or eliminated by virtue of the existence of the plastic contact shoes. Lastly, the manufacturing and assembly costs are considerably reduced by virtue of the use of a single mould to manufacture the guide sleeve 12 and the contact shoes 19. The assembly is also simplified since no additional manipulation is required by virtue of the existence of the linking webs 21 which are broken automatically the first time the thrust bearing is used.

I claim:

1. Clutch thrust being of the type comprising a rolling being equipped with an inner and an outer ring, one of the rings being adapted in order to come into permanent contact with a clutch member; a guide sleeve made from a moulded synthetic material and comprising a radial flange relative to which the rolling bearing can be displaced radially, the guide sleeve being slidable axially with respect to a guide tube under the action of a control member having end fingers, a metal support plate integral with the radial flange of the guide sleeve, contact shoes receiving the end fingers of the control member and placed in between the said fingers and the surface of the metal support plate of the radial flange, the contact shoes being integrally moulded with the guide sleeve and joined to the guide sleeve by linking webs having a weakened cross-section, said webs being broken under the action of forces exerted by the control member on the contact shoes when the clutch thrust bearing is operated for the first time.

2. Clutch thrust bearing according to claim 1, wherein the contact shoes are integral with an annular collar.

3. Clutch thrust bearing according to claim 1, wherein the contact shoes are made from a material having a low coefficient of friction.

4. Clutch thrust bearing according to claim 1, wherein the contact shoes have a concave surface for receiving the end fingers of the control member, opposite a plane surface interacting with the surface of the metal support plate.

5. Clutch thrust bearing according to claim 1, wherein the contact shoes have an axial guide rim for the end fingers.

6. Clutch thrust bearing according to claim 1, wherein the radial flange of the guide sleeve has guide lugs for the control member, which lugs are equipped with resilient tabs coming into contact with the end fingers and exerting a lateral prestress thereon.

7. Clutch thrust being according to claim 2, wherein the contact shoes are made from a material having a low coefficient of friction.

8. Clutch thrust bearing according to claim 7 wherein the contact shoes comprise a concave surface for receiving the end fingers of the control member, opposite a plane surface interacting with the surface of the metal support plate.

9. Clutch thrust bearing according to claim 7 wherein the contact shoes have an axial guide rim for the end fingers.

10. Clutch thrust being according to claim 7 wherein the radial flange of the guide sleeve has guide lugs for the control member, which lugs are equipped with resilient tabs coming into contact with the end fingers and exerting a lateral prestress thereon.

11. Clutch thrust bearing according to claim 2, wherein the contact shoes have a concave surface for receiving the end fingers of the control member, opposite a plane surface interacting with the surface of the metal support plate.

12. Clutch thrust bearing according to claim 11, wherein the contact shoes have an axial guide rim for the end fingers.

13. Clutch thrust being according to claim 11, wherein the radial flange of the guide sleeve has guide lugs for the control member, which lugs are equipped with resilient tabs coming into contact with the end fingers and exerting a lateral prestress thereon.

14. Clutch thrust bearing according to claim 2, wherein the contact shoes have an axial guide rim for the end fingers.

15. Clutch thrust bearing according to claim 14, wherein the radial flange of the guide sleeve has guide lugs for the control member, which lugs are equipped with resilient tabs coming into contact with the end fingers and exerting a lateral prestress thereon.

16. Clutch thrust bearing according to claim 2, wherein the radial flange of the guide sleeve has guide lugs for the control member, which lugs are equipped with resilient tabs coming into contact with the end fingers and exerting a lateral prestress thereon.

* * * * *